United States Patent
Giering et al.

(10) Patent No.: US 11,422,546 B2
(45) Date of Patent: Aug. 23, 2022

(54) MULTI-MODAL SENSOR DATA FUSION FOR PERCEPTION SYSTEMS

(71) Applicant: United Technologies Corporation, Farmington, CT (US)

(72) Inventors: Michael J. Giering, Bolton, CT (US); Kishore K. Reddy, Vernon, CT (US); Vivek Venugopalan, Bridgewater, NJ (US); Soumik Sarkar, Ames, IA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1126 days.

(21) Appl. No.: 15/536,713

(22) PCT Filed: Dec. 18, 2015

(86) PCT No.: PCT/US2015/066664
§ 371 (c)(1),
(2) Date: Jun. 16, 2017

(87) PCT Pub. No.: WO2016/100814
PCT Pub. Date: Jun. 23, 2016

(65) Prior Publication Data
US 2017/0371329 A1    Dec. 28, 2017

Related U.S. Application Data

(60) Provisional application No. 62/094,681, filed on Dec. 19, 2014.

(51) Int. Cl.
*G05B 23/02* (2006.01)
*G06K 9/62* (2022.01)
(Continued)

(52) U.S. Cl.
CPC ..... *G05B 23/0254* (2013.01); *G05B 23/0294* (2013.01); *G06K 9/6273* (2013.01);
(Continued)

(58) Field of Classification Search
CPC ............ G05B 23/0254; G05B 23/0294; G06K 9/6273; G06K 9/4628; G06K 9/6289;
(Continued)

(56) References Cited

U.S. PATENT DOCUMENTS 5,373,460 A    12/1994    Marks, II
6,578,040 B1 *  6/2003    Syeda-Mahmood ........................ G06K 9/00711

(Continued)

OTHER PUBLICATIONS

Elements of artificial neural networks': Mehrotra, 1997.*
(Continued)

*Primary Examiner* — Li B. Zhen
*Assistant Examiner* — Peter D Coughlan
(74) *Attorney, Agent, or Firm* — Cantor Colburn LLP

(57) ABSTRACT

A method includes fusing multi-modal sensor data from a plurality of sensors having different modalities. At least one region of interest is detected in the multi-modal sensor data. One or more patches of interest are detected in the multi-modal sensor data based on detecting the at least one region of interest. A model that uses a deep convolutional neural network is applied to the one or more patches of interest. Post-processing of a result of applying the model is performed to produce a post-processing result for the one or more patches of interest. A perception indication of the post-processing result is output.

18 Claims, 9 Drawing Sheets

(51) Int. Cl.
*G06V 10/44* (2022.01)
*G06V 20/56* (2022.01)
*G06T 7/246* (2017.01)
*G06N 3/04* (2006.01)
*G06N 3/08* (2006.01)

(52) U.S. Cl.
CPC ......... *G06K 9/6289* (2013.01); *G06N 3/0454* (2013.01); *G06N 3/08* (2013.01); *G06T 7/248* (2017.01); *G06V 10/454* (2022.01); *G06V 20/56* (2022.01)

(58) Field of Classification Search
CPC ............. G05D 1/0055; G05D 23/0254; G05D 1/0022; G06T 7/248; G06N 3/0454; G06N 3/08; B60W 30/09; B60W 30/0956
See application file for complete search history.

(56) References Cited

U.S. PATENT DOCUMENTS

| | | | | |
|---|---|---|---|---|
| 8,390,675 | B1* | 3/2013 | Riederer | H04N 13/246 348/47 |
| 2006/0221072 | A1* | 10/2006 | Se | G06T 7/593 345/420 |
| 2011/0231169 | A1 | 9/2011 | Furem et al. | |
| 2011/0288714 | A1* | 11/2011 | Flohr | G05D 1/0206 701/27 |
| 2013/0177235 | A1* | 7/2013 | Meier | G06T 15/00 382/154 |
| 2014/0019388 | A1 | 1/2014 | Kingsbury et al. | |
| 2014/0195192 | A1* | 7/2014 | Kimishima | G01P 3/64 702/149 |
| 2014/0222425 | A1* | 8/2014 | Park | G10L 15/24 704/243 |
| 2014/0226855 | A1* | 8/2014 | Savvides | G06K 9/00771 382/103 |
| 2014/0253760 | A1* | 9/2014 | Watanabe | H04N 5/265 348/239 |
| 2014/0294088 | A1* | 10/2014 | Sung | H04N 19/96 375/240.16 |
| 2014/0333787 | A1* | 11/2014 | Venkataraman | G06T 7/557 348/218.1 |
| 2016/0098037 | A1 | 4/2016 | Zornio et al. | |
| 2018/0217585 | A1 | 8/2018 | Giering et al. | |

OTHER PUBLICATIONS

'Large-Scale Malware Classification Using Random Projectionsand Neural Networks': Dahl, 2013, Proceedings IEEE Conference on Acoustics. Speech, and Signal Processing (ICASSP).*

Khunarsal et al., "Very short time environmental sound classification based on spectrogram pattern matching", Sep. 2013, Information Sciences, vol. 243, pp. 57-74 (Year: 2013).
V.T. Tran et al., "An approach to fault diagnosis of reciprocating compressor valves using Teager-Kaiser energy operator and deep belief networks," Jul. 2014, Expert Systems With Applications, vol. 41, No. 9, pp. 4113-4122 (Year: 2014).
B. Wu, et al., "Fast pedestrian detection with laser and image data fusion," Proceedings of the 6th International Conference on Image and Graphics, Aug. 12, 2011, pp. 605-608.
C. Premebida et al., "LIDAR and vision-based pedestrian detection system," Journal of Field Robotics, vol. 26, No. 9, Sep. 1, 2009, pp. 696-711.
International Application No. PCT/US2015/066664 International Search Report and Written Opinion, dated Apr. 26, 2016, 12 pages.
International Application No. PCT/US2015/066673 International Search Report and Written Opinion, dated Apr. 6, 2016, 12 pages.
J. Ngiam, et al., "Multimodal Deep Learning," Proceedings of the 28th International Conference in Machine Learning (ICML '11), Jun. 28, 2011, pp. 689-696.
J. Sun, et al., "Application of Deep Belief Networks for Precision Mechanism Quality Inspection," IFIP Advances in Information and Communication Technology, vol. 435, Feb. 16, 2014, pp. 87-93.
J. Xie, et al., "Learning Features from High Speed Train Vibration Signals with Deep Belief Networks," 2014 International Joint Conference on Neural Networks, Jul. 6-11, 2014, pp. 2205-2210.
M. Szarvas et al., "Real-time pedestrian detection using LIDAR and convolutional neural networks," Proceedings of the 2006 IEEE Intelligent Vehicles Symposium, Jun. 13-15, 2006, pp. 213-218.
N.K. Verma, et al. "Intelligent Condition Based Monitoring of Rotating Machines using Sparse Auto-encoders," Proceedings of the 2013 IEEE Conference on Prognostics and Health Management, Jun. 24, 2013, 7 pages.
P. Tamilselvan, et al., "Deep Belief Network Based State Classification for Structural Health Diagnosis," Proceedings of the 2012 IEEE Aerospace Conference, Mar. 3, 2012, 11 pages.
V.T. Tran et al., "An approach to fault diagnosis of reciprocating compressor valves using Teager-Kaiser energy operator and deep belief networks," Expert Systems With Applications, vol. 41, No. 9, Dec. 29, 2013, pp. 4113-4122.
Z. Kira, et al., "Long-Range Pedestrian Detection using Stereo with a Cascade of Convolutional Network Classifiers", Proceedings of the 2012 IEEE/RSJ International Conference on Intelligent Robots and Systems, Oct. 7, 2012, 8 pages.
Dahl et al., "Large Scale Malware Olassification Using Random Projections and Neural Networks", May 2013, IEEE all pages (Year: 2013), 7 pages.
Suhaimi, Emil Zaidan bin, "Intelligent Sensor Data Pre-processing Using Continuous Restricted Boltzmann Machine", Oct. 2013, all pages (Year: 2013), 52 pages.

* cited by examiner

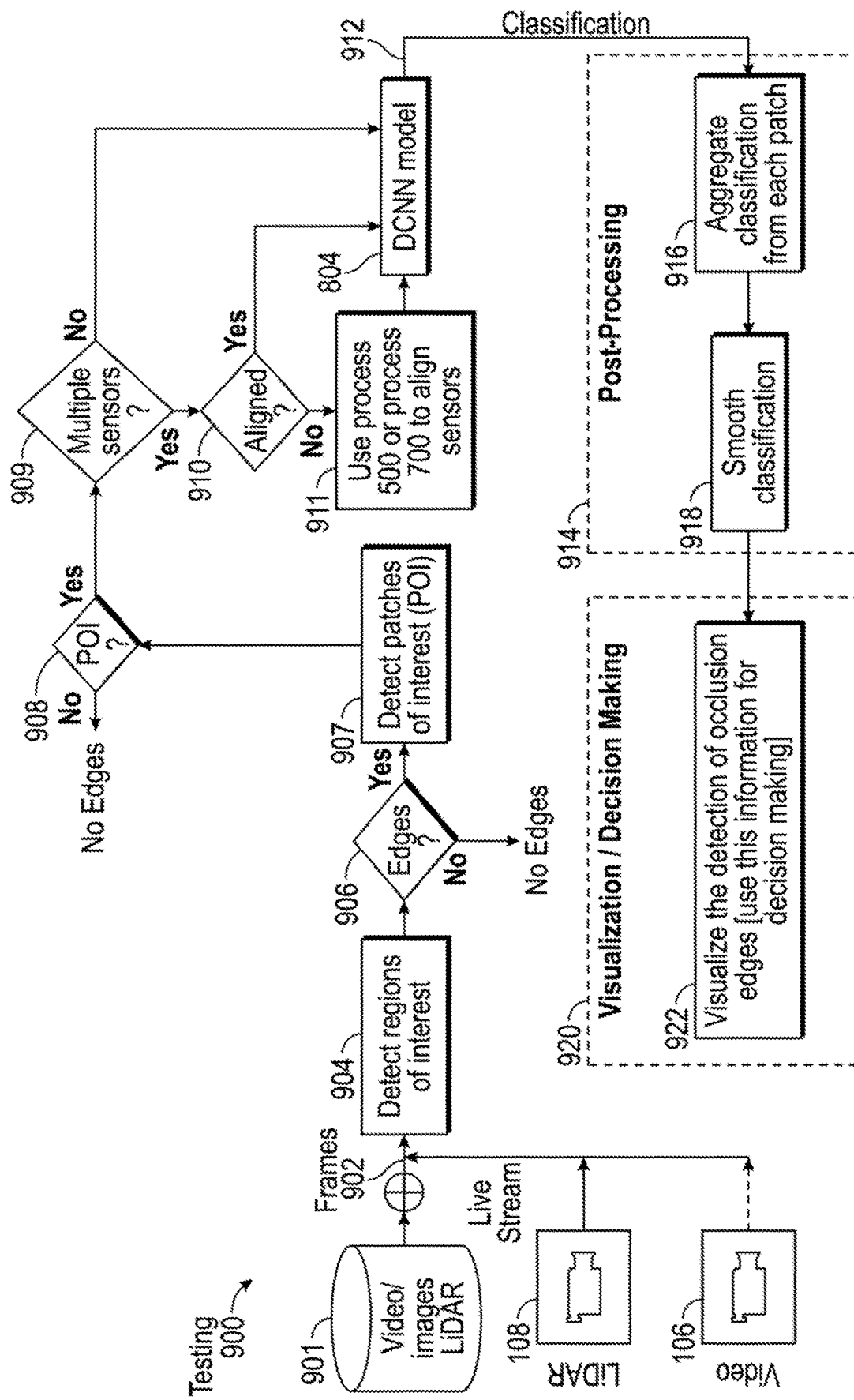

MULTI-MODAL SENSOR DATA FUSION FOR PERCEPTION SYSTEMS

CROSS REFERENCE TO RELATED APPLICATIONS

This application is a National Stage application of International Patent Application Serial No. PCT/US2015/066664, filed Dec. 18, 2015, which claims benefit to U.S. Provisional Application No. 62/094,681, filed Dec. 19, 2014, which are incorporated herein by reference in their entirety.

BACKGROUND

This disclosure relates to processing of sensor data, and more particularly to multi-modal sensor data fusion for perception systems.

Navigation and situational awareness of optionally manned vehicles typically requires the integration of multiple sensing modalities, such as Light Detection and Ranging (LiDAR) for depth and video for two-dimensional imaging. To extract meaning from multiple sensors, the sensor data must be fused to relate time series data from a variety of sensors that capture spatial information. For many tasks, such as pedestrian and object detection tasks that make use of multiple sensors, decision support methods rest on the assumption of proper data fusion. One aspect of data fusion is registration, where data collected from sensors having different coordinate systems are merged into a common coordinate system. Typical approaches in LiDAR-video registration, for instance, build separate vision and LiDAR feature extraction methods and identify common anchor points in both.

BRIEF DESCRIPTION

According to an embodiment, a method includes fusing multi-modal sensor data from a plurality of sensors having different modalities. At least one region of interest is detected in the multi-modal sensor data. One or more patches of interest are detected in the multi-modal sensor data based on detecting the at least one region of interest. A model that uses a deep convolutional neural network is applied to the one or more patches of interest. Post-processing of a result of applying the model is performed to produce a post-processing result for the one or more patches of interest. A perception indication of the post-processing result is output.

In addition to one or more of the features described above, or as an alternative, further embodiments could include where detecting the at least one region of interest includes performing edge detection on one or more images in the multi-modal sensor data.

In addition to one or more of the features described above, or as an alternative, further embodiments could include where the edge detection includes occlusion edge detection.

In addition to one or more of the features described above, or as an alternative, further embodiments could include where the model is trained using a supervised learning process for auto-registration of the multi-modal sensor data and outputs classification values.

In addition to one or more of the features described above, or as an alternative, further embodiments could include where the post-processing includes aggregating the classification values and identifying a dominating label representing an alignment offset between at least two of the sensors to determine whether a misalignment exists.

In addition to one or more of the features described above, or as an alternative, further embodiments could include where the model is trained using an unsupervised learning process using a deep auto-encoder and outputs reconstruction errors.

In addition to one or more of the features described above, or as an alternative, further embodiments could include where the post-processing includes aggregating the reconstruction errors and identifying a misalignment between at least two of the sensors based on the aggregation of the reconstruction errors.

In addition to one or more of the features described above, or as an alternative, further embodiments could include where the perception indication is a misalignment indicator used to adjust at least one actuator of the at least two sensors having the misalignment.

In addition to one or more of the features described above, or as an alternative, further embodiments could include where the model is trained using a supervised learning process for edge and occlusion edge labeling of the multi-modal sensor data and outputs classification values.

In addition to one or more of the features described above, or as an alternative, further embodiments could include where the post-processing includes aggregating the classification values and smoothing the classification, and further where the perception indication includes identification of occlusion edges.

In an embodiment a system includes a sensor system and a perception processor. The sensor system includes a plurality of sensors having different modalities. The perception processor is operable to fuse multi-modal sensor data from the sensors, detect at least one region of interest in the multi-modal sensor data, detect one or more patches of interest in the multi-modal sensor data based on detecting the at least one region of interest, apply a model including a deep convolutional neural network to at least one detected patch of interest, perform post-processing of a result of applying the model to produce a post-processing result for the at least one detected patch of interest, and output a perception indication of the post-processing result.

Technical function of the embodiments described above includes fusion of data from different sensor modalities, model development, sensor actuator control, and/or occlusion edge detection.

Other aspects, features, and techniques of the embodiments will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 9 illustrates a testing process using the model of FIG. 8 according to an embodiment.

DETAILED DESCRIPTION

Embodiments dynamically fuse information from available data channels for perception related tasks and alleviate the need for anchor points between sensor modalities. Example sensor modalities include LiDAR, video, Radio Detection And Ranging (RADAR), Short Wavelength Infrared (SWIR), and Global Positioning System (GPS) sensor data, for instance. Additionally, derived sensor modalities can be used as data channels, such as horizontal and vertical components of optical flow. Optical flow provides information of scene dynamics and is expressed as an estimate of velocity at each pixel from two consecutive image frames. To determine optical flow, a motion field change between two frames can be measured by the motion of a pixel brightness pattern, where the changes in image brightness are due to the camera and/or object motion. Embodiments can include training a model and testing of multi-modal sensor data using the model to perform various perception related tasks such as sensor alignment adjustment, visualization, and navigation decision making.

Figure 1:
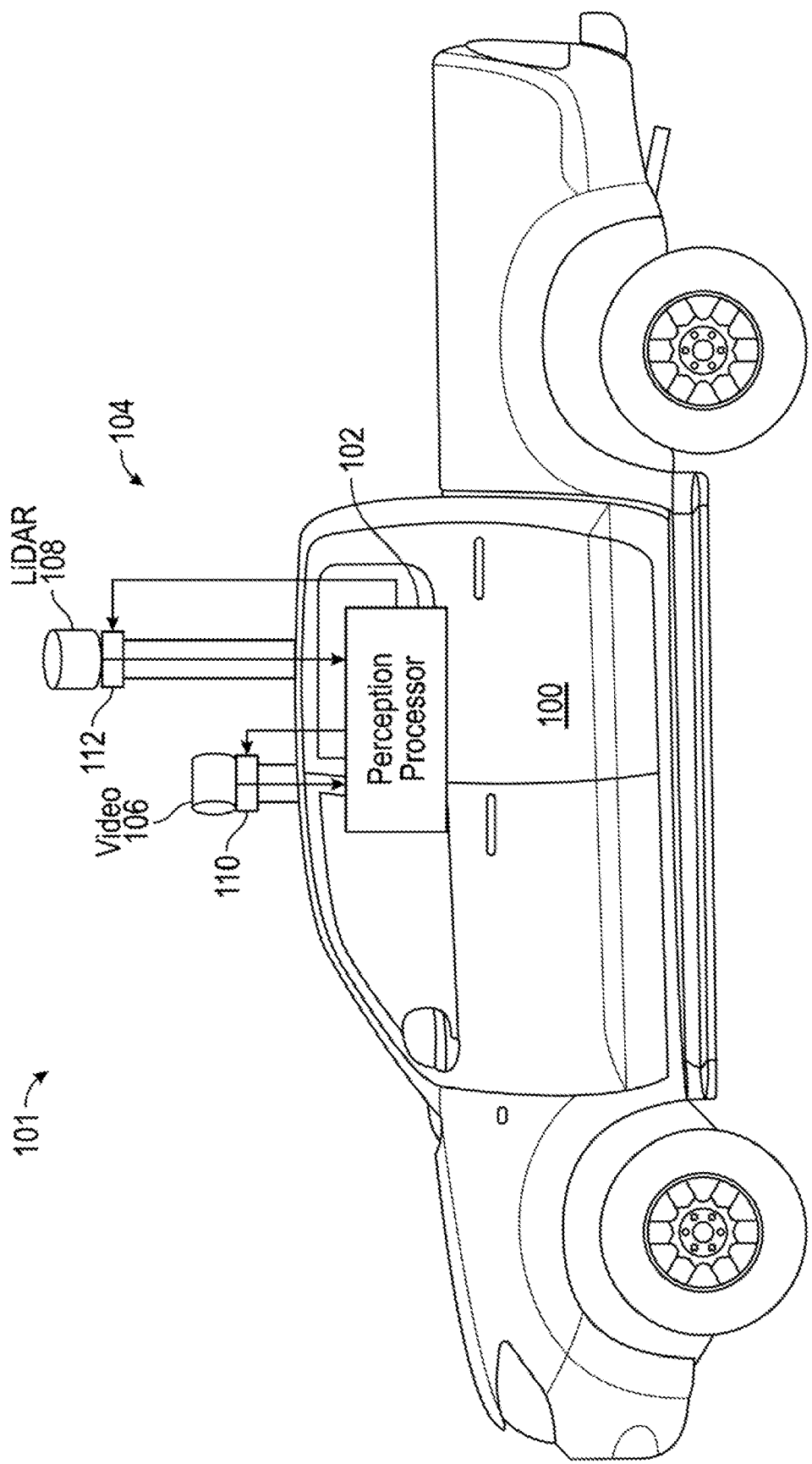
FIG. 1 illustrates a vehicle with a perception system according to an embodiment.

Referring now to the drawings, FIG. 1 illustrates a vehicle 100 with a perception system 101 according to an embodiment. Although vehicle 100 is depicted as a ground vehicle, embodiments can be applied to any type of vehicle or mobile machine that is optionally maimed or autonomous, such as an aircraft, watercraft, spacecraft, robot, or the like. The perception system 101 includes a perception processor 102 interfaced with a sensor system 104 that includes multiple modalities. In the example of FIG. 1, sensor system 104 includes at least one imaging sensor 106 and at least one ranging sensor 108. The imaging sensor 106 can be a video camera that provides color (e.g., red (R), green (G), blue (B)) and/or grayscale images to the perception processor 102. The ranging sensor 108 can be a LiDAR sensor or other similar sensor capable of determining depth/distance (e.g., an ultrasonic sensor). The perception processor 102 can control positioning of the imaging sensor 106 using actuator 110 and can control positioning of the ranging sensor 108 using actuator 112. The sensor system 104 can include other sensors types, such as gyroscopes, GPS, accelerometers, and the like.

The perception processor 102 is a processing system which can include memory to store instructions that are executed by one or more processors. The executable instructions may be stored or organized in any manner and at any level of abstraction, such as in connection with a controlling and/or monitoring operation of the sensor system 104 of FIG. 1. The one or more processors can be any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms in a non-transitory form. The perception processor 102 can include one or more graphics processing units (GPUs) which may support vector processing using a single instruction multiple datapath (SIMD) architecture to process multiple layers of data substantially in parallel.

Figure 2:
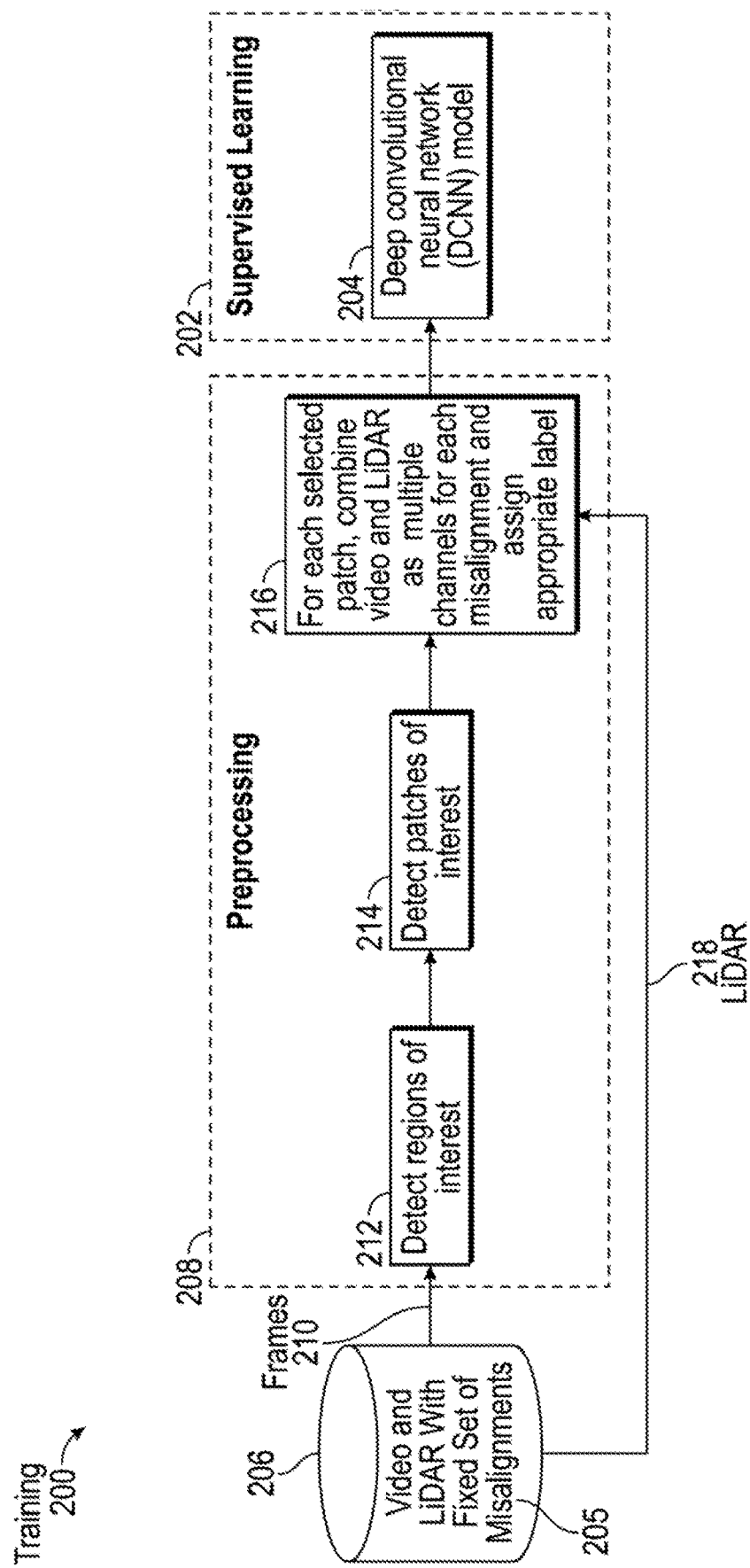
FIG. 2 illustrates a training process using supervised learning to train a model according to an embodiment.

FIG. 2 illustrates a training process 200 using supervised learning 202 to train a model 204 according to an embodiment. In the example of FIG. 2, a data source 206 provides training data 205 to develop the model 204 after preprocessing 208 is performed. The training data 205 in data source 206 can originate from data captured by the sensor system 104 of FIG. 1 during a training phase. The training process 200 may be performed as part of an off-line process using a separate processing system other than the perception processor 102 of FIG. 1. Alternatively, the perception processor 102 may be configured in a training phase to implement the training process 200 of FIG. 2.

In the example of FIG. 2, training data 205 includes video and LiDAR data with a fixed set of misalignments. For instance, since the imaging sensor 106 and ranging sensor 108 are mounted at different positions on the vehicle 100 of FIG. 1, the sensors 106 and 108 may not be aligned with precision for the same field of view. Further, the actuators 110 and 112 enable the sensors 106 and 108 to be dynamically repositioned. For purposes of training, one or more sets of misaligned data with a known degree of misalignment are used to train the model 204. Video frame data 210 from training data 205 can be provided to a region-of-interest detector 212 that may perform edge detection or other types of region detection known in the art as part of preprocessing 208. A patch detector 214 can detect patches (i.e., areas) of interest based on the regions of interest identified by the region-of-interest detector 212 as part of preprocessing 208. For example, a threshold can be applied on a percentage of pixels with edges in a given patch. A labeler 216 merges LiDAR data 218 from the training data 205 with video data 210 from selected patches of interest as detected by the patch detector 214 as part of preprocessing 208. For each selected patch, the labeler 216 fuses video frame data 210 and LiDAR data 218 as multiple channels for each misalignment and assigns labels. For example, if the training data 205 includes nine different misalignment sets, then labeling can be performed for each of the nine sets of misaligned data. The labeled data from the labeler 216 is used for supervised learning 202 to train model 204 using a convolutional neural network (CNN) which may also be referred to as a deep CNN or DCNN. The model 204 for auto-registration is trained to classify the current misalignment of the LiDAR-video data streams into a predefined set of offsets. Supervised learning 202 compares classification results of the model 204 to a ground truth and can continue running iterations of the model 204 until a desired level of classification confidence is achieved. The preprocessing 208 and training of the model 204 of FIG. 2 are further described with respect to FIGS. 3 and 4.

Figure 3:
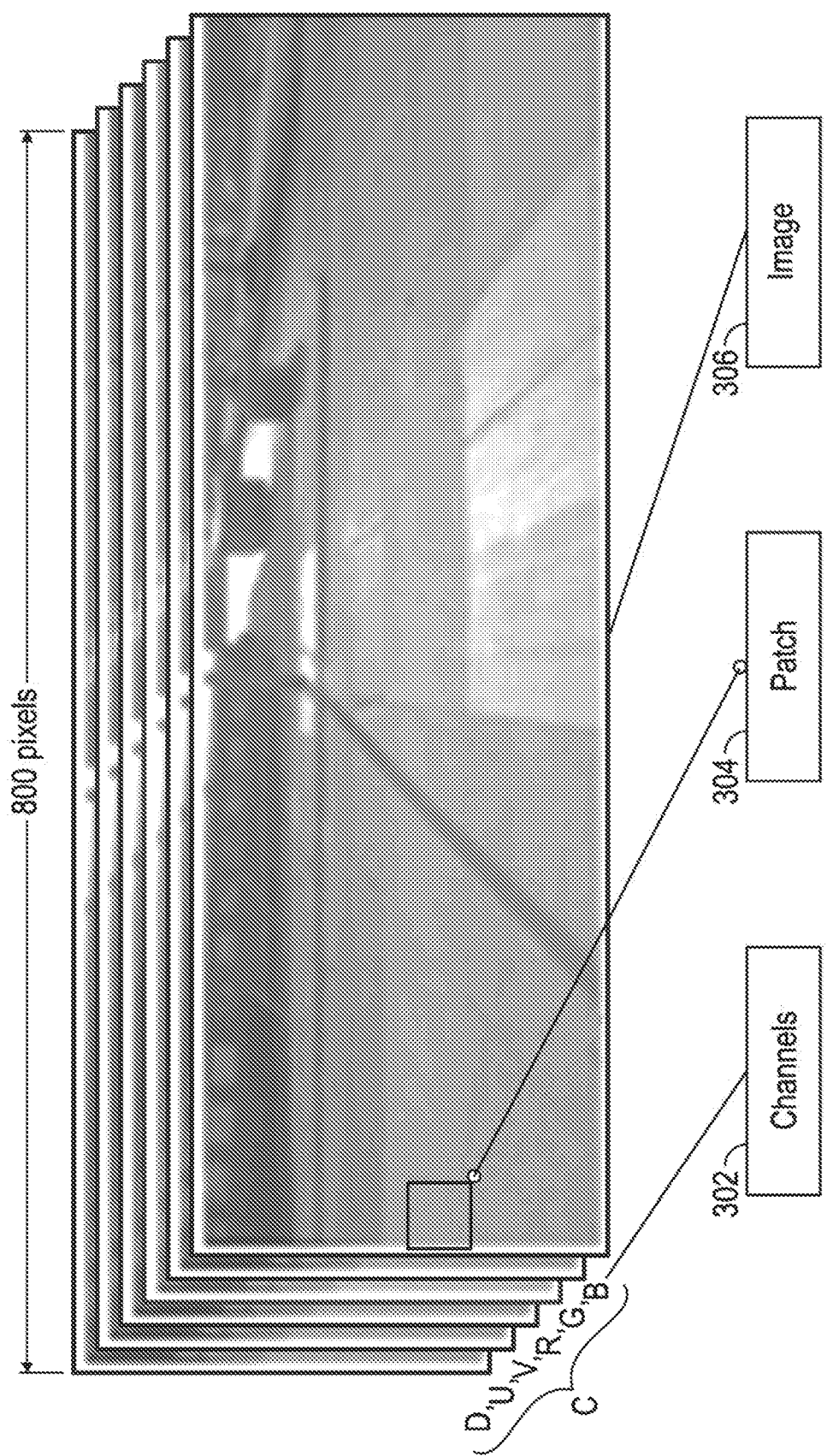
FIG. 3 illustrates a relationship between channels, patches, and images according to an embodiment.

FIG. 3 illustrates a relationship between channels 302, patches 304, and images 306. As one example, at each video frame time step, inputs to preprocessing 208 of FIG. 2 include C channels of data with C ranging from three to six channels 302. The channels 302 can include grayscale Gr or (R,G,B) information from the video frames 210, horizontal and vertical components of optical flow (U,V) derived from changes between the video frames 210, and depth information L from LiDAR data 218. The data from each modality in channels 302 are reshaped to a fixed size of 800×256 values in the example of FIG. 3 as images 306, which are partitioned into p×p patches 304 at a prescribed stride. Each p×p patch 304 is stacked across C channels 302, effectively generating a vector of C dimensions. Preprocessing parameters are denoted by patch size p, stride s, and the number of input channels C.

Preprocessing 208 is repeated N times, where N is the number of offset classes. For each offset class, the video (R,G,B) and optical flow (U,V) channels can be kept static, and the depth (L) channel from the LiDAR data 218 can be shifted by an offset misalignment between the imaging sensor 106 and the ranging sensor 108 of FIG. 1. In order to accurately detect the misalignment in the sensor data, a threshold can be set to limit the information available in each channel. The LiDAR data 218 typically has regions of sparsity and hence the LiDAR patches with a variance (e.g., $\sigma^2 < 15\%$) are dropped from the final data set. This leads to the elimination of the majority of foreground patches in the data set, reducing the size of the training set.

Figure 4:
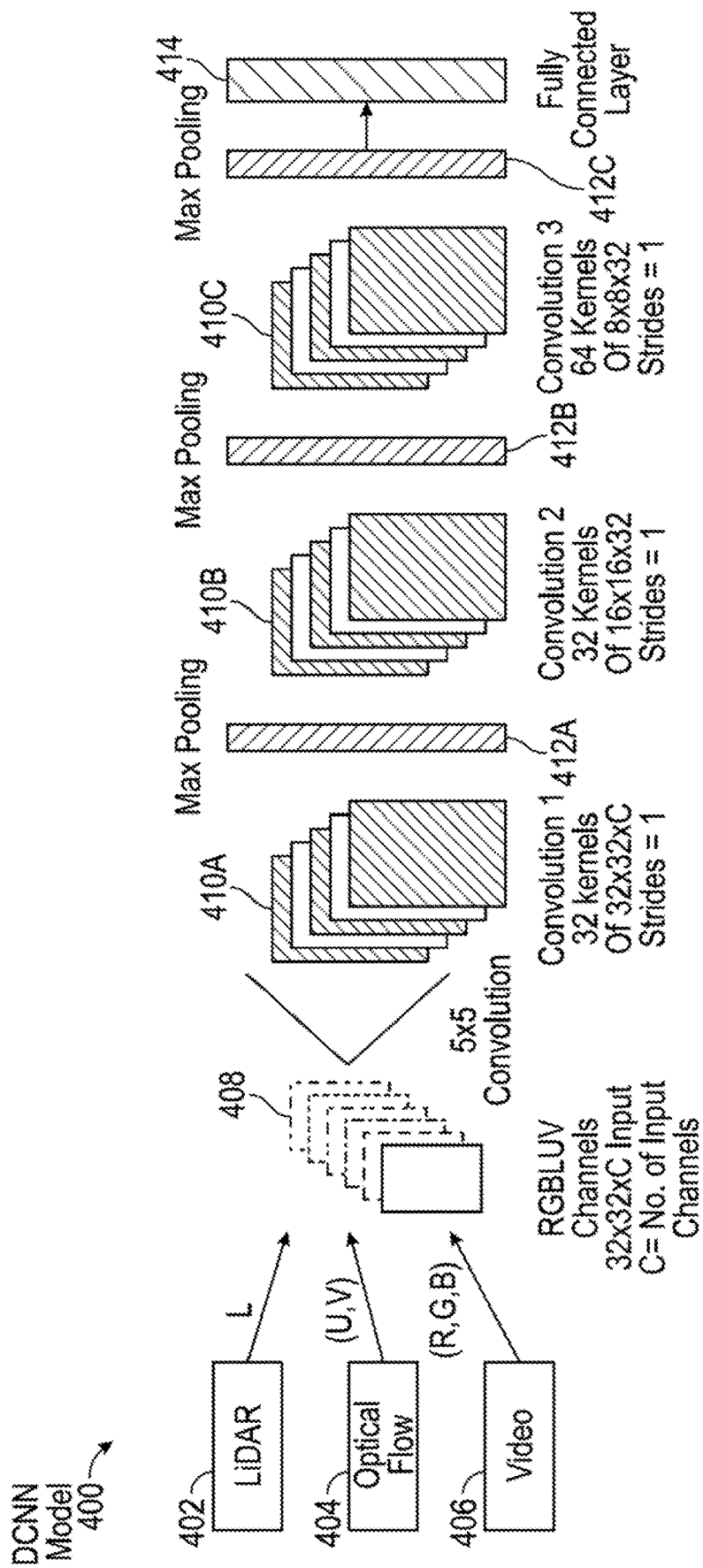
FIG. 4 illustrates a deep convolutional neural network model according to an embodiment.

FIG. 4 illustrates a deep convolutional neural network (DCNN) model 400 according to an embodiment. The DCNN model 400 is an example of the model 204 of FIG. 2. The DCNN model 400 shares weights in the training phase (e.g., training process 200), resulting in fewer model parameters and more efficient training as compared to other machine learning methods. DCNNs in general are particularly useful for problems in which local structure is important, such as object recognition in images and temporal information for voice recognition. Alternating steps of convolution and pooling generate features at multiple scales, which in turn imbue the DCNN model 400 with scale invariant characteristics.

The DCNN model 400 is a feedforward artificial neural network that has more than one layer of hidden units between its inputs and outputs. Each hidden unit, j, uses a nonlinear mapping function, often the logistic function, to map its total input from the layer below, $x_j$, to the scalar state, $y_j$, that it sends to the layer above, where $b_j$ is the bias of unit j, i is an index over units in the layer below, and $w_{ij}$ is the weight to unit j from unit i in the layer below. The values of $y_j$ and $x_j$ can be computed according to equation 1.

$$y_j = \frac{1}{1+e^{-x_j}} \text{ where } x_j = b_j + \sum_i y_i w_{ij} \quad \text{(Equation 1)}$$

For DCNNs, convolution is performed at convolutional layers to extract local structure features from the features of the previous layer. Additive bias is applied at this point. This is followed by a local pooling step. A nonlinear mapping (e.g., a sigmoid) is applied after either the convolution or pooling layer and can vary by implementation. Iteratively repeating the convolution and pooling steps results in a DCNN architecture for DCNN model 400 as illustrated in FIG. 4.

The value for each spatial point (x,y) on the jth feature map in the ith layer is denoted as v according to equation 2, where $b_{ij}$ is the bias for the feature map, m indexes over the set of feature maps in the (i−1)th layer connected to the current feature map, w is the value at the position (p,q) of the kernel connected to the kth feature map, and $P_i$ and $Q_i$ are the height and width of the kernel respectively.

$$v_{ij}^{xy} = \tanh(b_{ij} + \Sigma_m \Sigma_p^{P_i - 1} w_{ijm}^{pq} v_{(i-1)m}^{(x+p)(y+q)}) \quad \text{(Equation 2)}$$

In the context of sensor registration, the target layer of the DCNN model 400 can be chosen to represent the degree to which sensor information is misaligned. This information can in turn be used to properly register sensor data by physical manipulation of the sensors or within the system software. Methods for improving the accuracy of DCNN model 400, such as dropout, may be applied. Dropout (e.g., averaging results over multiple lower dimensional versions of the model) can be especially useful for applications where the amount of available data is of a marginal size to learn the number of necessary parameters in the DCNN model 400.

In embodiments having initial data with sensors properly registered, the DCNN model 400 can be trained on versions of the data at various known offsets, such as the example of FIG. 2 to train model 204. The input to the DCNN model 400 can be a matrix representation of channels 408 from sensors 106, 108 and any supplemental information nodes (e.g., LiDAR 402, video 404, optical flow 406). The DCNN model 400 can be created with standard iterative layers of convolution 410 and pooling 412, terminating in a soft-max layer 414 for classification of any input sensor pairings as one of the known offsets. The soft-max layer 414 is a fully connected layer that enables the offset prediction to be interpreted as a distribution or as a discrete classification result.

In the example of FIG. 4, the DCNN model 400 includes three pairs of convolution-pooling layers that estimate the offset between the LiDAR-video inputs at each time step. For each patch within a time step, there are N variants with the LiDAR-video-optical flow inputs offset by the predetermined amounts. The DCNN model 400 outputs to soft-max layer 414, thereby providing an offset classification value for each patch of the frame. Patches, such as patches 304 of FIG. 3, may be implemented as 32×32 patches stacked across the different channels and provided as the input channels 408 to the DCNN model 400. All six channels 408 (RGBLUV) may be used or fewer/alternate input configurations can be used in embodiments. As one example, a first convolutional layer 410A uses 32 filters (or kernels) of size 5×5×C with a stride of 1 pixel and padding of 2 pixels on the edges. A first pooling layer 412A generates input data (of size 16×16×32) for a second convolutional layer 410B. The second convolutional layer 410B can use 32 filters of size 5×5×32 with a stride of 1 pixel and padding of 2 pixels on the edges. A second pooling layer 412B, similar to the first pooling layer 412A is used to generate input with size 8×8×32 for a third convolutional layer 410C that uses 64 filters of size 5×5×32 with the stride and padding configured the same as the second convolutional layer 410B. The third pooling layer 412C with a similar configuration as the first and second pooling layers 412A, 412B connects to soft-max layer 414 with labels corresponding to classes generated from the shifted data. In one embodiment, the DCNN model 400 was trained using stochastic gradient descent with a mini-batch size of 100 epochs. The DCNN model 400 can be configured with Rectified Linear Units (ReLUs) that train several times faster than equivalents with tanh connections.

Figure 5:
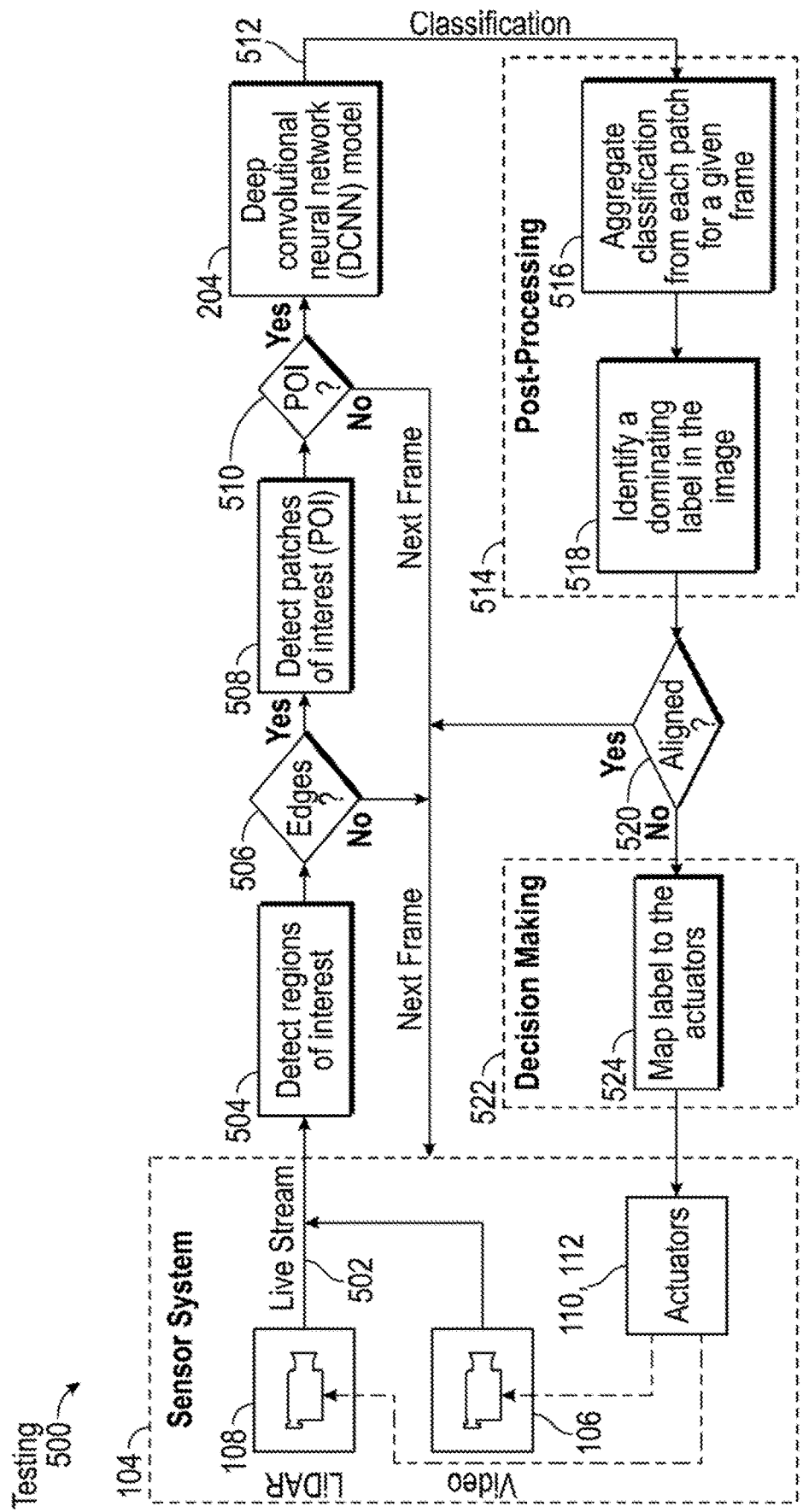
FIG. 5 illustrates a testing process using the model of FIG. 2 according to an embodiment.

FIG. 5 illustrates a testing process 500 using the model 204 of FIG. 2 according to an embodiment. The testing process 500 can be implemented by the perception system 102 of FIG. 1. Multi-modal sensor data 502 from sensors 106 and 108 having different modalities can be fused in a live stream from sensor system 104, for instance, including video and LiDAR data. Fusing of multi-modal sensor data 502 can also include creating one or more derived input channels for data derived from sensor data, such as optical flow. A region-of-interest detector 504 analyzes the multi-modal sensor data 502 to detect any regions of interest such as edges. The region-of-interest detector 504 can perform the same operations as the region-of-interest detector 212 of FIG. 2, for instance, using edge detection techniques known in the art.

If no regions of interest (e.g., edges) are detected by the region-of-interest detector 504, then block 506 continues processing of the multi-modal sensor data 502 as more samples/frames of data are acquired. If at least one region of interest is detected by the region-of-interest detector 504, then block 506 passes the region of interest information to a patch detector 508. The patch detector 508 can perform the same operations as the patch detector 214 of FIG. 2. For example, the patch detector 508 can detect patches (i.e., areas) of interest based on the regions of interest identified by the region-of-interest detector 504. A threshold can be applied on a percentage of pixels with edges in a given patch to reduce the data set size passed to the model 204 trained by training process 200 of FIG. 2.

At block 510, if the patch detector 508 does not detect at least one patch of interest, then processing of the multi-modal sensor data 502 continues as more samples/frames of data are acquired. If the patch detector 508 detects one or more patches of interest in the multi-modal sensor data 502, then the model 204 is applied to the one or more patches of interest using a deep convolutional neural network based on the training process 200 of FIG. 2. In the example of FIG. 5, a result of the model 204 includes classification values 512 that are provided to post-processing 514.

The post-processing 514 can include aggregating 516 the classification values 512 and identifying 518 a dominating label representing an alignment offset between sensors 106, 108 to determine whether a misalignment exists. For example, various horizontal and vertical offsets between sensors 106 and 108 can have classification values assigned (e.g., class1=no offset, class2=pixel offset (12, 32), class3=pixel offset (0, 24), class4=pixel offset (16, 8), class5=pixel offset (20,−16), etc.). When classifications are aggregated from each patch for a given frame, a dominating (i.e., most common) label is used as a final alignment/misalignment indicator post-processing result. At block 520, if the alignment is deemed to be correct (e.g., within a threshold misalignment), then processing of the multi-modal sensor data 502 continues as more samples/frames of data are acquired. If there is a misalignment detected at block 520, then a decision making block 522 determines how to adjust either or both of the actuators 110, 112 by mapping 524 the dominating label from block 518 to positioning of the actuators 110, 112. For instance, if the dominating label maps to a misalignment offset X/Y between the actuators 110, 112, the decision making block 524 can command adjustments to either or both of the actuators 110, 112 to correct the misalignment. Commanding adjustments to both actuators 110, 112 in parallel may correct the misalignment faster as both move a smaller amount individually to remove a relative misalignment difference between sensors 106 and 108.

Figure 6:
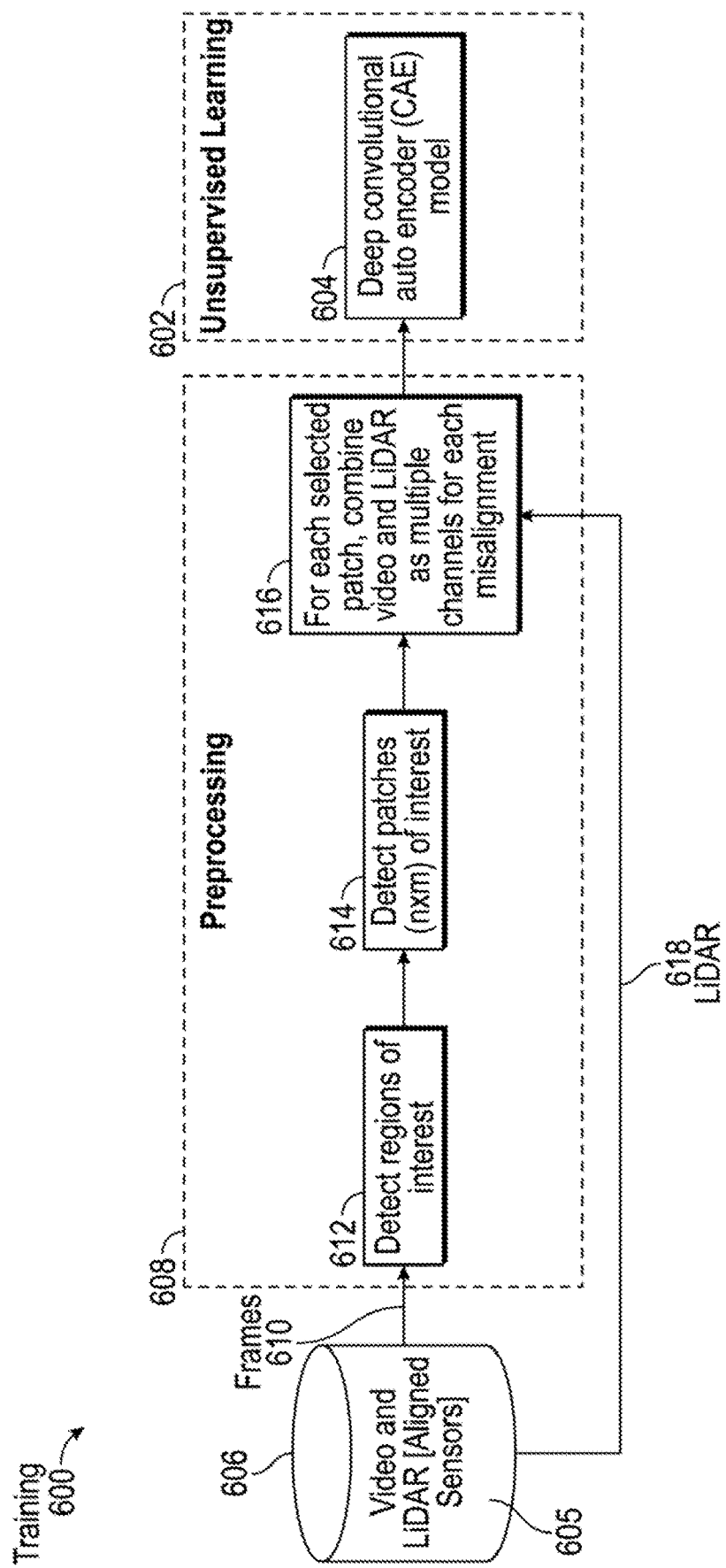
FIG. 6 illustrates a training process using unsupervised learning to train a model according to an embodiment.

FIG. 6 illustrates a training process 600 using unsupervised learning 602 to train a model 604 according to an embodiment. In the example of FIG. 6, a data source 606 provides training data 605 to develop the model 604 after preprocessing 608 is performed. The training data 605 in data source 606 can originate from data captured by the sensor system 104 of FIG. 1 during a training phase. The training process 600 may be performed as part of an off-line process using a separate processing system other than the perception processor 102 of FIG. 1. Alternatively, the perception processor 102 may be configured in a training phase to implement the training process 600 of FIG. 6.

In the example of FIG. 6, training data 605 includes video and LiDAR data from aligned sensors, e.g., sensors 106 and 108 of FIG. 1. Given multi-modal sensor data with no prior knowledge of the system, it is possible to register the data streams. For illustration, training process 600 is described with respect to a LiDAR-video registration example. By creating an over-constrained deep auto-encoder (DAC) definition, the DAC can be driven to capture mutual information in both the LiDAR and video data by reducing the randomness of a DAC bottleneck layer (i.e., a reduction layer) well beyond the rank at which optimal reconstruction occurs. Minimizing the reconstruction error with respect to relative shifts of the LiDAR-video data reflects that the current alignment of the sensor data has the greatest correlation possible (i.e., smallest misalignment). This method can be applied for both spatial and temporal registration.

A deep neural network auto-encoder (DNN-AE) takes an input $x \in R^d$ and first maps it to the latent representation $h \in R^{d'}$ using a deterministic function of the type $h = f_\theta = \sigma(Wx+b)$ with $\theta = \{W, b\}$ where W is the weight and b is the bias. This "code" is then used to reconstruct the input by a reverse mapping of $y = f_{\theta'}(h) = \sigma(W'h+b')$ with $\theta' = \{W', b'\}$. The two parameter sets are usually constrained to be of the form $W' = W^T$, using the same weights for encoding the input and decoding the latent representation. Each training pattern $x_i$ is then mapped onto its code $h_i$ and its reconstruction $y_i$. The parameters are optimized, minimizing an appropriate cost function over the training set $D_n = \{(x_0, t_0), \ldots, (x_n, t_n)\}$.

The first step includes using a probabilistic Restricted Boltzmann Machine (RBM) approach, trying to reconstruct noisy inputs. The training process 600 can involve the reconstruction of a clean sensor input from a partially destroyed/missing sensor. The sensor input x becomes corrupted sensor input $\bar{x}$ by adding a variable amount v of noise distributed according to the characteristics of the input data. An RBM network is trained initially with the same number of layers as envisioned in the final DNN-AE in model 604. The parameter v represents the percentage of permissible corruption in the network. The model 604 is trained to de-noise the inputs by first finding the latent representation $h = f_\theta(\bar{x}) = \sigma(W\bar{x}+b)$ from which to reconstruct the original input $y = f_{\theta'}(h) = \sigma(W'h+b')$.

As part of preprocessing 608, video frame data 610 from training data 605 can be provided to a region-of-interest detector 612 that may perform edge detection or other types of region detection known in the art, similar to region-of-interest detector 212 of FIG. 2. A patch detector 614 can detect patches (i.e., areas) of interest based on the regions of interest identified by the region-of-interest detector 612 as part of preprocessing 608, similar to patch detector 214 of FIG. 2. Data fuser 616 can merge LiDAR data 618 from the training data 605 with video data 610 from selected patches of interest as detected by the patch detector 614 as part of preprocessing 608. The video frame data 610 and LiDAR data 618 fused as multiple channels for each misalignment are provided for unsupervised learning 602 of model 604. Although depicted as a deep convolutional auto-encoder (CAE), the model 604 can use a CAE or a DNN-AE, and more generally, a deep auto-encoder.

Figure 7:
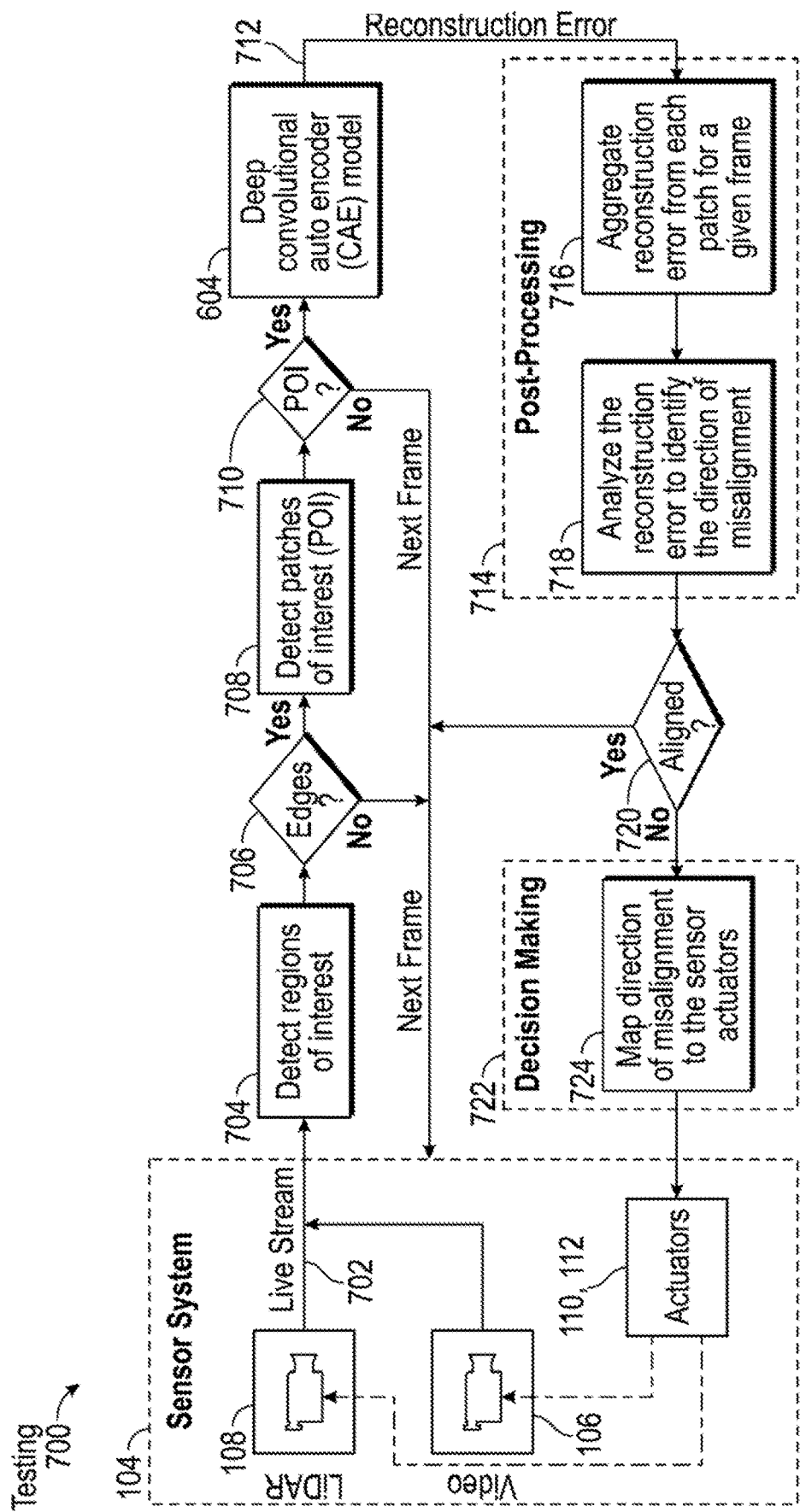
FIG. 7 illustrates a testing process using the model of FIG. 6 according to an embodiment.

FIG. 7 illustrates a testing process 700 using the model 604 of FIG. 6 according to an embodiment. The testing process 700 can be implemented by the perception system 102 of FIG. 1. Multi-modal sensor data 702 from sensors 106 and 108 having different modalities can be fused in a live stream from sensor system 104, for instance, including video and LiDAR data. Fusing of multi-modal sensor data 702 can also include creating one or more derived input channels for data derived from sensor data, such as optical flow. A region-of-interest detector 704 analyzes the multi-modal sensor data 702 to detect any regions of interest, such as edges. The region-of-interest detector 704 can perform the same operations as the region-of-interest detector 612 of FIG. 6, for instance, using edge detection techniques known in the art.

If no regions of interest (e.g., edges) are detected by the region-of-interest detector 704, then block 706 continues processing of the multi-modal sensor data 702 as more samples/frames of data are acquired. If at least one region of interest is detected by the region-of-interest detector 704, then block 706 passes the region of interest information to a patch detector 708. The patch detector 708 can perform the same operations as the patch detector 614 of FIG. 6. For example, the patch detector 708 can detect patches (i.e., areas) of interest based on the regions of interest identified by the region-of-interest detector 704. A threshold can be applied on a percentage of pixels with edges in a given patch to reduce the data set size passed to the model 604 trained by training process 600 of FIG. 6.

At block 710, if the patch detector 708 does not detect at least one patch of interest, then processing of the multi-modal sensor data 702 continues as more samples/frames of data are acquired. If the patch detector 708 detects one or more patches of interest in the multi-modal sensor data 702, then the model 604 is applied to the one or more patches of interest using a deep convolutional neural network based on the training process 600 of FIG. 6. In the example of FIG. 7, a result of the model 604 includes a reconstruction error 712 that is provided to post-processing 714.

The post-processing 714 can include aggregating 716 the reconstruction error 712 from each patch for a given frame and analyzing 718 the reconstruction error to identify the direction of misalignment between sensors 106, 108. At block 720, if the alignment is deemed to be correct (e.g., within a threshold misalignment), then processing of the multi-modal sensor data 702 continues as more samples/frames of data are acquired. If there is a misalignment detected at block 720, then a decision making block 722 determines how to adjust either or both of the actuators 110, 112 by mapping 724 the misalignment from block 718 to positioning of the actuators 110, 112.

Figure 8:
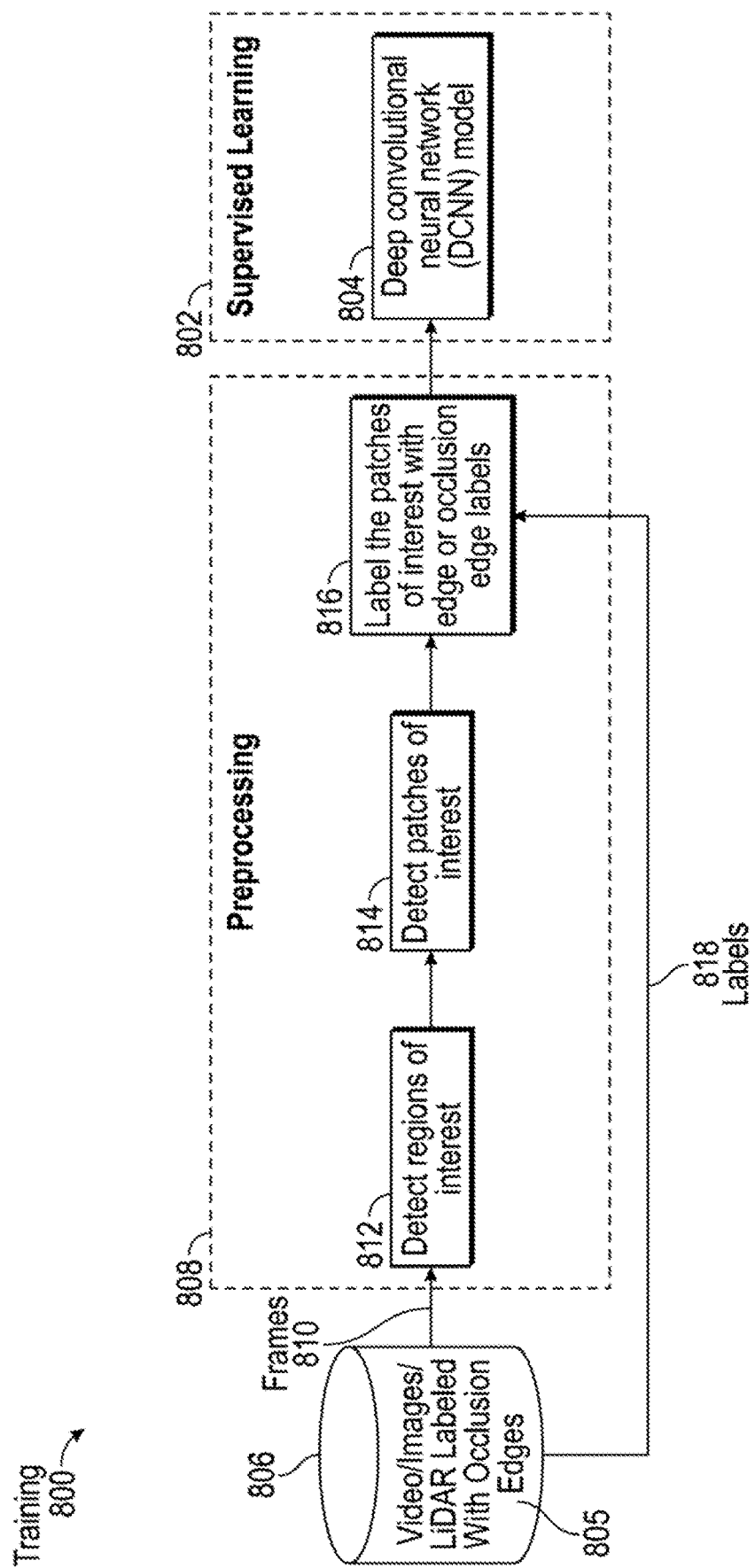
FIG. 8 illustrates a training process using occlusion edge detection to train a model according to an embodiment.

The testing process 500 of FIG. 5 and testing process 700 of FIG. 7 can be used to adjust the alignment of sensors 106 and 108 of FIG. 1 depending on whether supervised or unsupervised learning is performed. In order to perform occlusion edge detection, the sensors 106 and 108 must be aligned. Therefore, either testing process 500 of FIG. 5 or testing process 700 of FIG. 7 can be performed to align the sensors 106 and 108 prior to executing a training process 800 of FIG. 8 to perform occlusion edge detection to train a model 804 with supervised learning 802 according to an embodiment. In the example of FIG. 8, a data source 806 provides training data 805 to develop the model 804 after preprocessing 808 is performed. The training data 805 in data source 806 can originate from data captured by the sensor system 104 of FIG. 1 during a training phase, where the data are labeled with occlusion edges for training. The training process 800 may be performed as part of an off-line process using a separate processing system other than the perception processor 102 of FIG. 1. Alternatively, the perception processor 102 may be configured in a training phase to implement the training process 800 of FIG. 8.

In the example of FIG. 8, training data 805 includes video and labeled LiDAR data with occlusion edges. Occlusion edges are useful for a wide array of perception related tasks including object recognition, feature selection, grasping, obstacle avoidance, navigating, path-planning, localization, mapping, stereo-vision and optic flow. In addition to numerous applications, occlusions edges can be used in perception applications for figure/ground determination. Once occlusion boundaries have been established, depth order of regions becomes possible which aids navigation, simultaneous localization and mapping (SLAM) and path planning. Occlusion edges help image feature selection by rejecting features generated from regions that span an occlusion edge. As these are dependent on viewpoint position, removing variant features saves further processing and increases recognition accuracy.

In many object recognition problems, the shape of the object is better for recognition rather than its appearance, which can be dramatically altered, e.g., by painted objects, shadows, camouflage and people wearing different clothes. However, shape determination is not the approach for SIFT-based object recognition algorithms. Furthermore, knowledge of occlusion edges helps with stereo vision and optic flow algorithms. In robotics, geometric edges of objects demarcate spatial extents helping with grasping, manipulation as well as maneuvering through the world without collision and therefore, knowledge of occlusion edges is essential.

As part of preprocessing 808, video frame data 810 from training data 805 can be provided to a region-of-interest detector 812 that may perform edge detection, occlusion edge detection, and/or other types of region detection known in the art. A patch detector 814 can detect patches (i.e., areas) of interest based on the regions of interest identified by the region-of-interest detector 812 as part of preprocessing 808, similar to patch detector 214 of FIG. 2. A labeler 816 merges labeled LiDAR data 818 from the training data 805 with video data 810 from selected patches of interest as detected by the patch detector 814 as part of preprocessing 808. For each selected patch, the labeler 816 labels patches of interest with edge or occlusion edge labels based on a dominating (i.e., most common) label for the selected patch. Labeling can simply indicate whether or not occlusion edges have been found. Once pre-training and preprocessing 808 are done, the model 804 uses the DCNN model 400 of FIG. 4 in performing supervised learning 802 with respect to a ground truth.

FIG. 9 illustrates a testing process 900 using the model 804 of FIG. 8 according to an embodiment. Multi-modal sensor data 902 from data source 901 (e.g., previously acquired data) having different modalities can be fused with a live stream of sensor data from either or both sensors 106 and 108 of sensor system 104 of FIG. 1 including, for instance, LiDAR and/or video data. Fusing of multi-modal sensor data 902 can also include creating one or more derived input channels for data derived from sensor data, such as optical flow. A region-of-interest detector 904 analyzes the multi-modal sensor data 902 to detect any regions of interest such as edges and/or occlusion edges. The region-of-interest detector 904 can perform similar operations as the region-of-interest detector 812 of FIG. 8, for instance, using edge detection and occlusion edge techniques known in the art.

If no regions of interest (e.g., edges and/or occlusion edges) are detected by the region-of-interest detector 904, then block 906 continues processing of the multi-modal sensor data 902 as more samples/frames of data are acquired. If at least one region of interest is detected by the region-of-interest detector 904, then block 906 passes the region of interest information to a patch detector 907. The patch detector 907 can perform similar operations as the patch detector 814 of FIG. 8. For example, the patch detector 907 can detect patches (i.e., areas) of interest based on the regions of interest identified by the region-of-interest detector 904. Patches containing edges identified using data from video/image frames can be analyzed further using LiDAR data for depth perception to assign a confidence of the existence of edges and/or occlusion edges in patches of interest.

At block 908, if the patch detector 907 does not detect at least one patch of interest, then processing of the multi-modal sensor data 902 continues as more samples/frames of data are acquired. If the patch detector 907 detects one or more patches of interest in the multi-modal sensor data 902, then a check can be performed at block 909 to determine whether there are multiple sensors of different modalities available. For example, one or more of the sensors 106 and 108 may not be available due to damage or a fault condition. If multiple sensors are determined to be available at block 909, then at block 910 an alignment check is performed to determine whether sensors 106 and 108 are presently aligned or misaligned. If the sensors misaligned, then at block 911 a portion of process 500 of FIG. 5 (supervised) or process 700 of FIG. 7 (unsupervised) can be performed to correct sensor alignment prior to applying model 804. If at block 909 multiple sensors are unavailable or at block 910 the sensors are aligned, then model 804 is applied. The model 804 is applied to the one or more patches of interest using a deep convolutional neural network based on the training process 800 of FIG. 8. In the example of FIG. 9, a result of the model 804 includes classification data 912 (e.g., occlusion edge/no occlusion edge classification per patch) that are provided to post-processing 914.

The post-processing 914 can include aggregating 916 the classification data 912 from each patch as a classification result and smoothing 918 the classification result, for instance, using a Gaussian filter and/or temporal information, resulting in a post-processing result. A visualization/decision making block 920 outputs perception indication 922 that includes identification of occlusion edges. For example, the perception indication 922 can include occlusion edge detection information used by a decision making process, such as autonomous navigation of the vehicle 100 of FIG. 1.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of providing a perception system of a vehicle, the method comprising:
receiving multi-modal sensor data from a plurality of sensors mounted at different positions on the vehicle and having different modalities comprising an imaging sensor configured to capture a video input and a ranging sensor configured to capture a depth input;
deriving a plurality of horizontal and vertical components of optical flow data defining a change in scene dynamics between at least two frames of the video input based on a motion field change;
fusing multi-modal sensor data from the plurality of sensors having different modalities and the plurality of horizontal and vertical components of optical flow data;
detecting at least one region of interest in the multi-modal sensor data;
detecting one or more patches of interest in the multi-modal sensor data based on detecting the at least one region of interest;
applying a model comprising a deep convolutional neural network to the one or more patches of interest, wherein the model is trained using a supervised learning process for auto-registration of the multi-modal senor data and outputs classification values;
performing post-processing of a result of applying the model to produce a post-processing result for the one or more patches of interest, wherein the post-processing comprises aggregating the classification values and identifying a dominating label representing an alignment offset between at least two of the sensors to determine whether a misalignment exists for a same field of view; and
outputting a perception indication of the post-processing result to a decision-making process for autonomous navigation of a vehicle.

2. The method of claim 1, wherein detecting the at least one region of interest comprises performing edge detection on one or more images in the multi-modal sensor data.

3. The method of claim 2, wherein the edge detection comprises occlusion edge detection.

4. The method of claim 1, wherein detecting the one or more patches of interest comprises applying a threshold on a percentage of pixels with edges in a given patch.

5. The method of claim 1, wherein the perception indication is a misalignment indicator used to adjust at least one actuator of the at least two sensors having the misalignment.

6. The method of claim 1, wherein the model is trained using a supervised learning process for occlusion edge labeling of the multi-modal senor data and outputs classification values.

7. The method of claim 6, wherein the postprocessing comprises smoothing the classification, and further wherein the perception indication comprises identification of occlusion edges.

8. The method of claim 1, further comprising:
adjusting at least two actuators in parallel based on the misalignment, each of the at least two actuators controlling one of the at least two sensors to correct the misalignment.

9. A method of providing a perception system of a vehicle, the method comprising:
receiving multi-modal sensor data from a plurality of sensors mounted at different positions on the vehicle and having different modalities comprising an imaging sensor configured to capture a video input and a ranging sensor configured to capture a depth input;
deriving a plurality of horizontal and vertical components of optical flow data defining a change in scene dynamics between at least two frames of the video input based on a motion field change;

fusing multi-modal sensor data from the plurality of sensors having different modalities and the plurality of horizontal and vertical components of optical flow data;

detecting at least one region of interest in the multi-modal sensor data;

detecting one or more patches of interest in the multi-modal sensor data based on detecting the at least one region of interest;

applying a model comprising a deep convolutional neural network to the one or more patches of interest, wherein the model is trained using an unsupervised learning process using a deep auto-encoder and outputs reconstruction errors;

performing post-processing of a result of applying the model to produce a post-processing result for the one or more patches of interest, wherein the post-processing comprises aggregating the reconstruction errors and identifying a misalignment between at least two of the sensors based on the aggregation of the reconstruction errors for a same field of view; and outputting a perception indication of the post-processing result to a decision-making process for autonomous navigation of a vehicle.

10. The method of claim 9, wherein the perception indication is a misalignment indicator used to adjust at least one actuator of the at least two sensors having the misalignment.

11. The method of claim 9, further comprising:

adjusting at least two actuators in parallel based on the misalignment, each of the at least two actuators controlling one of the at least two sensors to correct the misalignment.

12. A system of a vehicle comprising:

a sensor system comprising a plurality of sensors mounted at different positions on the vehicle and having different modalities; and a perception processor configured to:

receive multi-modal sensor data from a plurality of sensors having different modalities comprising an imaging sensor configured to capture a video input and a ranging sensor configured to capture a depth input;

derive a plurality of horizontal and vertical components of optical flow data defining a change in scene dynamics between at least two frames of the video input based on a motion field change;

fuse multi-modal sensor data from the plurality of sensors and the plurality of horizontal and vertical components of optical flow data;

detect at least one region of interest in the multi-modal sensor data;

detect one or more patches of interest in the multi-modal sensor data based on detecting the at least one region of interest, apply a model comprising a deep convolutional neural network to at least one detected patch of interest;

perform post-processing of a result of applying the model to produce a post-processing result for the at least one detected patch of interest; and output a perception indication of the post-processing result to a decision-making process for autonomous navigation of a vehicle, wherein the model is trained using a supervised learning process for auto-registration of the multi-modal senor data and outputs classification values, and wherein the post-processing comprises aggregating the classification values and identifying a dominating label representing an alignment offset between at least two of the sensors to determine whether a misalignment exists of a same field of view.

13. The system of claim 12, wherein the at least one region of interest is detected by performing edge detection on one or more images in the multi-modal sensor data.

14. The system of claim 12, wherein detection of the one or more patches of interest comprises applying a threshold on a percentage of pixels with edges in a given patch.

15. The system of claim 12, wherein the perception indication is a misalignment indicator used to adjust at least one actuator of the at least two sensors having the misalignment.

16. The system of claim 12, wherein the model is trained using a supervised learning process for occlusion edge labeling of the multi-modal senor data and outputs classification values.

17. The system of claim 12, wherein the postprocessing comprises aggregating the classification values and smoothing the classification, and further wherein the perception indication comprises identification of occlusion edges.

18. The system of claim 12, further comprising:

at least two actuators, wherein the perception processor is configured to adjust the at least two actuators in parallel based on the misalignment, each of the at least two actuators controlling one of the at least two sensors to correct the misalignment.

* * * * *